US012778361B2

(12) United States Patent
Muraoka

(10) Patent No.: US 12,778,361 B2
(45) Date of Patent: Nov. 3, 2026

(54) USER POSITION SENSOR AND USER PROFILES FOR TOILET

(71) Applicant: Kohler Co., Kohler, WI (US)

(72) Inventor: Hiroyuki Muraoka, Milwaukee, WI (US)

(73) Assignee: Kohler Co., Kohler, WI (US)

( * ) Notice: Subject to any disclaimer, the term of this patent is extended or adjusted under 35 U.S.C. 154(b) by 140 days.

(21) Appl. No.: 18/773,925

(22) Filed: Jul. 16, 2024

(65) Prior Publication Data

US 2025/0040769 A1 Feb. 6, 2025

Related U.S. Application Data

(60) Provisional application No. 63/649,035, filed on May 17, 2024, provisional application No. 63/529,873, filed on Jul. 31, 2023.

(51) Int. Cl.
*A47K 13/10* (2006.01)
*G06T 7/73* (2017.01)

(52) U.S. Cl.
CPC ................ *A47K 13/10* (2013.01); *G06T 7/74* (2017.01); *G06T 2207/30201* (2013.01)

(58) Field of Classification Search
CPC .............. A47K 13/10; G06T 7/74; E03D 9/00
See application file for complete search history.

(56) References Cited

U.S. PATENT DOCUMENTS

| | | | | |
|---|---|---|---|---|
| 7,051,381 | B2 | 5/2006 | Furukawa | |
| 10,172,503 | B2 | 1/2019 | Wei | |
| 10,501,921 | B2 | 12/2019 | Leng | |
| 11,096,530 | B2 | 8/2021 | Henderson | |
| 2019/0089550 | A1 * | 3/2019 | Rexach ................ | A47K 5/1217 |
| 2021/0106191 | A1 * | 4/2021 | Chung ................. | A47K 13/247 |
| 2021/0338023 | A1 | 11/2021 | Henderson | |
| 2022/0304527 | A1 | 9/2022 | Wu | |
| 2022/0395149 | A1 | 12/2022 | Shimazu | |
| 2023/0290148 | A1 | 9/2023 | Wu | |
| 2024/0090879 | A1 * | 3/2024 | Kanai ................ | A61B 10/0038 |

(Continued)

FOREIGN PATENT DOCUMENTS

| | | | |
|---|---|---|---|
| CN | 106939632 | A | 7/2017 |
| CN | 106223435 | B | 2/2019 |
| CN | 109426168 | A | 3/2019 |

(Continued)

OTHER PUBLICATIONS

Extended European Search Report from European Patent Application No. 24191296.3, dated Dec. 18, 2024, 27 pages.

(Continued)

*Primary Examiner* — Christine J Skubinna
(74) *Attorney, Agent, or Firm* — Lempia Summerfield Katz LLC

(57) ABSTRACT

A toilet includes a base, a seat rotatably coupled to the base, a drive mechanism, a sensor, and a controller. The drive mechanism is configured to rotate the seat with respect to the base. The sensor is configured to generate image data for a user within a predetermined distance to the base. The controller is configured to determine an orientation of the user based on the image data and generate a command for the drive mechanism in response to the orientation of the user.

19 Claims, 8 Drawing Sheets

(56) References Cited

U.S. PATENT DOCUMENTS

2025/0361707 A1 * 11/2025 Harker ...................... E03D 5/10

FOREIGN PATENT DOCUMENTS

| | | | |
|---|---|---|---|
| CN | 209162970 | U | 7/2019 |
| CN | 210227996 | U | 4/2020 |
| CN | 113026882 | A | 6/2021 |
| CN | 215127929 | U | 12/2021 |
| EP | 3238587 | A1 | 11/2017 |
| EP | 3238587 | B1 | 2/2021 |
| JP | H06105758 | A | 4/1994 |
| JP | 2019198385 | A | 11/2019 |
| JP | 2019198386 | A | 11/2019 |
| WO | 1995010971 | A1 | 4/1995 |
| WO | 2013029503 | A1 | 3/2013 |
| WO | 2019199925 | A1 | 10/2019 |
| WO | 2019222948 | A1 | 11/2019 |
| WO | 2022163034 | A1 | 8/2022 |

OTHER PUBLICATIONS

Horow Hr-g10 Luxury Wall Mounted Heated Bidet Auto Open Lid Smart Toilet; https://horowbath.com/products/horow-hr-g10-luxury-wall-mounted-heated-bidet-auto-open-lid-smart-toilet; Date Accessed Oct. 10, 2023.

Examination Report from Indian Patent Application No. 202414056340, dated Apr. 23, 2026, 12 pages.

* cited by examiner

USER POSITION SENSOR AND USER PROFILES FOR TOILET

CROSS-REFERENCE TO RELATED APPLICATION

This application claims priority to U.S. Provisional Application No. 63/649,035 filed May 17, 2024 and U.S. Provisional Application 63/529,873 filed Jul. 31, 2023, and each of which is incorporated by reference in its entirety.

FIELD

The present disclosure relates generally to toilets. More specifically, the present disclosure relates to toilets having features that improve the cleanliness and use thereof.

BACKGROUND

In some conventional toilets, the toilet covers and seats are typically hingably attached to a portion of a toilet base, such that a user can raise the front of each of the cover and the seat from a closed or lowered position to an open or stowed position. The cover and the seat each pivot about a horizontal axis between the lowered position and the stowed position. However, it is often difficult to maintain both the cleanliness of the toilet, particularly at the hinge location, and the overall look and aesthetics of the toilet with this traditional configuration and movement.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

DETAILED DESCRIPTION

Figure 1:
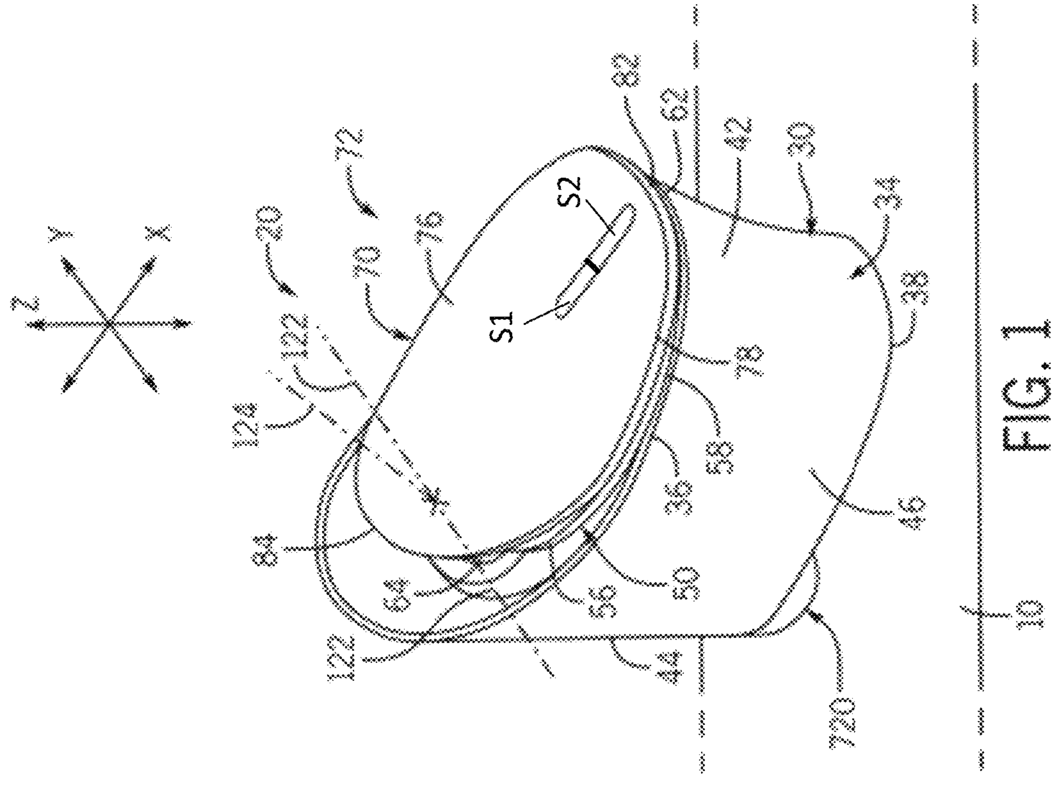
FIG. 1 is a perspective view of a toilet according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is not defined by any particular embodiment described herein.

Referring generally to the figures, disclosed herein are toilets (referred to herein as a toilet 20 and a toilet 20') that include structural features, components, and integrated systems that can provide for a cleaner and more hygienic user experience, as compared to conventional toilets. For example, the various components, features, and configuration of the toilets 20,20', as described further herein, allow the toilets 20,20' to present a touchless hygienic mode of operation, as compared to conventional toilets. In addition, the various components, features, and configuration of the toilets 20,20', as described further herein, allow the toilets 20,20' to help maintain their cleanliness, look cleaner, and have a more simplified, elegant, and hygienic structure, as compared to some conventional toilets. The various features described herein (e.g., the opening mechanisms 120,120') can, advantageously, be activated automatically to provide for an enhanced user experience. Furthermore, various features allow each of the toilets 20,20' to operate as an intelligent toilet to suit a user's needs.

It should be noted that the toilets 20,20' described herein are configured to have similar structural features, components, functions, and integrated systems. Accordingly, for the sake of brevity, the following description focuses primarily on the various features and functions of the toilet 20, but it should be appreciated that these features and functions may also apply to the toilet 20' and vice versa, except where noted otherwise.

Toilet Cover and Seat Opening Mechanism

In some conventional toilets, the toilet covers and seats are typically hingably attached to a portion of a toilet base, such that a user can raise the front of each of the cover and the seat from a closed or lowered position to an open or stowed position. The cover and the seat each pivot about a horizontal axis between the lowered position and the stowed position. However, it is often difficult to maintain both the cleanliness of the toilet, particularly at the hinge location, and the overall look and aesthetics of the toilet with this traditional configuration and movement.

Further, with a cover and seat that each pivot about a horizontal axis between the lowered position and the stowed position, it is difficult to provide an electrically operated (e.g., battery operated) cover and seat opening mechanism due to the amount of stored energy necessary to lift the cover and seat against gravity. Accordingly, in these types of cover and seat opening mechanisms, automatic sensing of the user's position for automatically opening the cover and seat also has high electrical power requirements.

Further, with a cover and seat that each pivot about a horizontal axis between the lowered position and the stowed position, it is difficult to provide independent operation of the seat and the cover for different user requirements. The following embodiments include user sensing and detection techniques that independently operate the opening and closing of the seat and cover in response to the position of the user.

Figure 2:
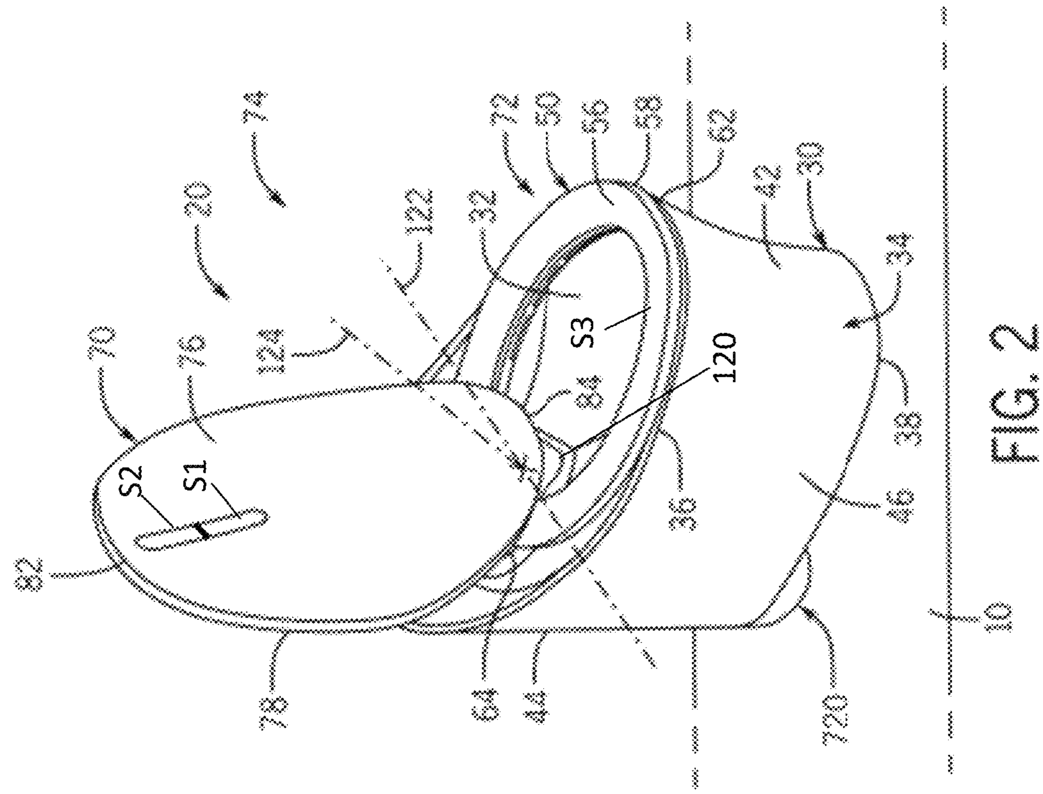
FIG. 2 is a perspective view of the toilet of FIG. 1 with the cover in a stowed position and the seat in a lowered position.
Figure 3:
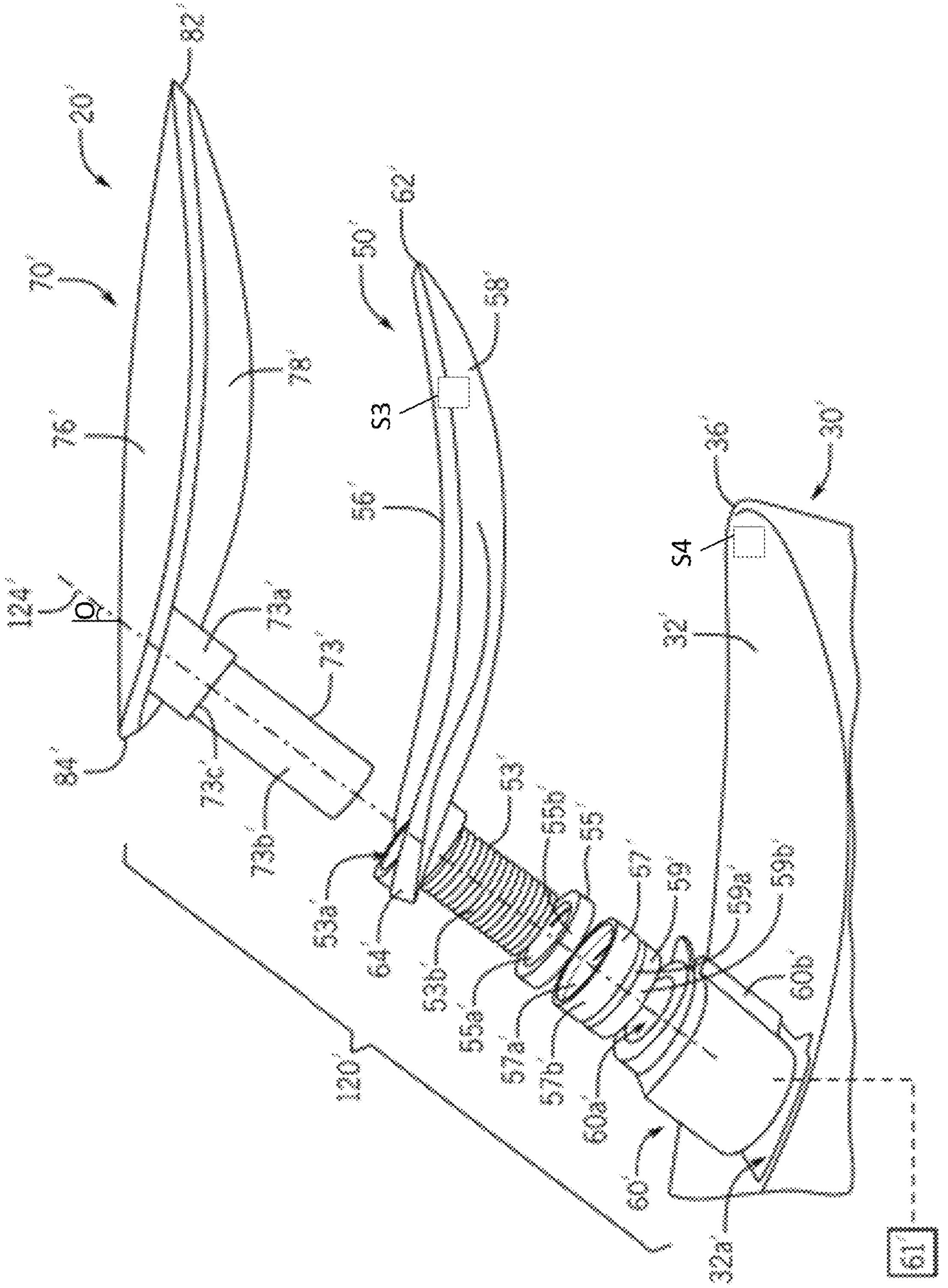
FIG. 3 is an exploded view of a cover and seat opening mechanism of the toilet.

Accordingly, as shown in the exemplary embodiment of FIGS. 1-2, the toilet 20 includes a cover and seat opening mechanism 120 that allows both a cover 70 and a seat 50 to be easily moved, with low electrical power requirements, relative to the toilet 20 and to maintain the cleanliness (in particular during use) of the toilet 20. More specifically, as shown in FIGS. 1-3, the hinge, pivot, or opening mechanism 120 allows each of the cover 70 and the seat 50 to be moved between a lowered position 72, in which the cover 70 and seat 50 are located adjacent a base 30 (as shown in FIG. 1), and a stowed position 74, in which the cover 70 and the seat 50 are oriented in an upward direction away from the base 30 (as shown in FIG. 2). The cover 70 and the seat 50 may be moved individually and separately (i.e., at different times).

In order to allow the cover 70 and the seat 50 to move between the lowered position 72 and the stowed position 74, the opening mechanism 120 may include a ball-and-socket hinge or joint between the cover 70 and the base 30. Specifically, the cover 70 (including front end 82 and back end 84) and the seat 50 (including front end 62 and back end 64) are each first pivoted upward about a substantially lateral axis 122 to a certain angle (as described further herein) and then swiveled or rotated backward about an angled axis 124 to move from the lowered position 72 into the stowed position 74. The transverse or lateral axis 122 (i.e., the y-axis, shown in FIG. 4) refers to a direction extending horizontally along the width of the base 30.

The seat 50 is rotated such that, in the lowered position 72, the top surface 56 of the seat 50 faces away from the bowl 32 and the top rim 36 of the base 30, and the bottom surface 58 of the seat 50 faces toward the bowl 32 and the top rim 36 of the base 30. In the stowed position 74, the top surface 56 of the seat 50 faces toward the front end 42 of the base 30 and the bottom surface 78 of the cover 70, and the bottom surface 58 of the seat 50 faces toward the back end 44 of the base 30.

While the cover 70 and the seat 50 are in the stowed position 74, the top rim 36 and the bowl 32 of the base 30 are exposed and the user may therefore use the toilet 20. For example, the user may use the toilet 20 while standing and thus facing the top surface 76 of the cover 70 in this position.

It is understood that, in order to move the cover 70 and the seat 50 back from the stowed position 74 to the lowered position 72, the cover 70 and the seat 50 are moved in the same, but opposite, manner as described above.

As shown, when the cover 70 and the seat 50 are in the lowered position 72, the seat 50 is positioned between the cover 70 and the top rim 36 of the base 30 such that the cover 70 covers and obscures the seat 50. Additionally, when the cover 70 and the seat 50 are in the stowed position 74, the seat 50 is positioned between the cover 70 and the back end 44 of the base 30 such that the cover 70 also covers and obscures the seat 50 in this position.

According to another exemplary embodiment shown in FIG. 3, the toilet 20' includes a cover and seat opening mechanism 120' that allows both a cover 70' and a seat 50' to be easily moved relative to the toilet 20' and to maintain the cleanliness (in particular during use) of the toilet 20', similar to the opening mechanism 120 of the toilet 20 discussed above. The toilet 20' includes a cover 70', a seat 50', and a base 30'. The cover 70', the seat 50', and the base 30' have a similar structural configuration as the corresponding cover 70, seat 50, and base 30 of the toilet 20 discussed above, except that the cover 70', the seat 50', and the base 30' include features that cooperatively define an opening mechanism 120' that is different than the opening mechanism 120. The opening mechanism 120' can, advantageously, allow for the cover 70' and the seat 50' to each be rotated about an angled axis 124' between a lowered position 72', in which the cover 70' and the seat 50' are located adjacent the base 30', and a stowed position 74', in which the cover 70' and the seat 50' are oriented in an upward direction away from the base 30'. The cover 70' and the seat 50' may be moved individually and separately (i.e., at different times). Alternatively, the cover 70' and the seat 50' may be moved together (i.e., at the same time) and may be moved aligned with each other or misaligned with each other, according to a user's preference.

As shown in FIG. 3, the opening mechanism 120' is cooperatively defined by features of the cover 70', the seat 50', a housing 60', and the base 30'. For example, the cover 70' includes a top surface 76' having a generally convex shape or portion, and a bottom surface 78' located opposite the top surface 76' having a generally concave shape or portion. The cover 70' further defines a front end 82' and a back end 84' located opposite the front end 82'. The cover 70' includes an elongated member 73' extending outwardly away from the bottom surface 78' toward the back end 84'. The elongated member 73' has a generally cylindrical shape defined by a first portion **73*a*' and a second portion 73*b*' extending from the first portion 73*a*'. The elongated member 73' may include one or more openings extending therethrough to receive, for example, a fluid conduit, electrical wiring, or other components of the cover 70' (e.g., flush mechanism, bidet mechanism, etc.). The first portion 73*a*' has a diameter that is greater than the diameter of the second portion 73*b*', so as to define a flange 73*c*' for limiting an axial position of the cover 70' relative to the seat 50', the details of which are discussed in the paragraphs that follow. The elongated member 73' also defines the angled axis 124' for the cover 70'** to rotate about, as discussed in greater detail below.

The seat 50' includes a top surface 56' having a generally convex shape that is complementary to the surface profile of the bottom surface 78' of the cover 70'. The seat 50' further includes a bottom surface 58' located opposite the top surface 56'. The seat 50' further defines a front end 62' and a back end 64' located opposite the front end 62'. The seat 50' includes a substantially hollow elongated member 53' extending outwardly away from the bottom surface 58' toward the back end 64'. The hollow elongated member 53' has a generally hollow cylindrical shape that defines an opening **53*a*' extending through the top surface 56' of the seat and through the entire length of the hollow elongated member 53'. The hollow elongated member 53' may receive the elongated member 73' of the cover 70' through at least a portion of, or the entire length of, the opening 53*a*'**.

According to an exemplary embodiment, the opening **53*a*' is countersunk to define an inner flange for engaging the flange 73*c*' of the elongated member 73' near the top surface 56', so as to limit the axial position of the cover 70' relative to the seat 50' to permit relative rotational movement between the cover 70' and the seat 50'. The cover 70' can rotate relative to the seat 50' via the elongated member 73' within the opening 53*a*' of the hollow elongated member 53'. Likewise, the seat 50' can rotate relative to the cover 70' via the hollow elongated member 53'. As such, both the elongated member 73' and the hollow elongated member 53' cooperatively define the same angled axis 124'. As shown in FIG. 3, the hollow elongated member 53' also includes an outer surface having an outer thread 53*b*' for threadably engaging a first rotatable member 55'. The first rotatable member 55' has a ring shape that defines an inner thread 55*a*'** and an outer surface 55*b*'. The inner thread 55*a*' may selectively threadably engage the outer thread 53*b*' to permit translational movement of the seat 50' and the cover 70' in an axial direction along the angled axis 124'. Rotating the first rotatable member 55' about the angled axis 124' will cause the hollow elongated member 53' to telescope or translate outwardly along the angled axis 124' via the threads 53*b*'. This translational movement will cause the seat 50' and the cover 70' to both move in an upward and forward direction along the angled axis 124' toward a front end of the base 30'.

The angled axis 124' may be angled off the vertical axis according to an offset angle O, as illustrated in FIG. 3. In another alternative, the cover 70' and the seat 50' are rotated about the vertical axis. In other words, the cover 70' and the seat 50' rotate without being flipped over. When the rotation axis is the vertical axis, the cover 70' and the seat 50' rotate in a horizontal plane without being flipped over. Thus, the user contacting surface of the seat remains facing up in both the open and closed position. In other examples, the angled axis 124' may be substituted with any nonhorizontal axis such that the cover 70' and the seat 50' are not flipped up and are not rotated about a horizontal axis.

The opening mechanism 120' further includes a second rotatable member 57' for coupling to the elongated member 73'. For example, the elongated member 73' may have a length sufficient to extend through the opening 53*a*' at a distal end of the hollow elongated member 53', such that the second rotatable member 57' can couple to a portion of the elongated member 73' that extends through the opening 53*a*'. The second rotatable 57' has a ring shape that defines an inner surface 57*a*' and an outer surface 57*b*'. The inner surface 57*a*' may be fixedly coupled to an outer surface of the second portion 73*b*' of the elongated member 73'. According to an exemplary embodiment, the outer surface 57*b*' may define one or more gear teeth for engaging one or more separate drive gears of a motor 61'. For example, the motor 61' may be an electric motor that includes one or more separate drive gears including gear teeth that can rotatably engage complementary gear teeth on the outer surface 57*b*' of the second rotatable member 57', so as to selectively rotate the second rotatable member 57' and the cover 70' about the angled axis 124' via the elongated member 73' in response to a user input. According to other exemplary embodiments, the motor 61' may be configured to engage and rotate the second rotatable member 57' in other ways besides a gear arrangement, such as rotatable bearings, a belt drive, etc. In this manner, the cover 70' can be automatically, and independently, rotated about the angled axis 124' via the motor 61'.

Still referring to FIG. 3, the opening mechanism 120' further includes a third rotatable member 59' for coupling to the hollow elongated member 53'. The third rotatable member 59' has a ring shape that defines an inner surface 59*a*' and an outer surface 59*b*'. The inner surface 59*a*' may be fixedly coupled to the second portion of the hollow elongated member 53'. According to an exemplary embodiment, the outer surface 59*b*' may define one or more gear teeth for engaging one or more separate drive gears of the motor 61'. For example, the motor 61' may be an electric motor that includes one or more separate drive gears including gear teeth that can rotatably engage complementary gear teeth on the outer surface 59*b*' of the third rotatable member 59', so as to selectively rotate the third rotatable member 59' and the seat 50' about the angled axis 124' via the hollow elongated member 53' in response to operation of the motor. According to other exemplary embodiments, the motor 61' may include a plurality of separate motors for separately engaging the first rotatable member 55', the second rotatable member 57', and the third rotatable member 59', respectively. According to other exemplary embodiments, the motor 61' may be configured to engage and rotate the third rotatable member 59' in other ways besides a gear arrangement. In this manner, the seat 50' can be automatically, and independently, rotated about the angled axis 124' in a similar manner as the cover 70'.

The opening mechanism 120' further includes a housing 60' for containing the first rotatable member 55', the second rotatable member 57', the third rotatable member 59', and portions of the elongated members 53',73'. The housing 60' includes an opening 60*a*' for receiving portions of the elongated members 53',73' therein. The housing 60' may include additional openings to provide an interface between the rotatable members 55',57',59' and the one or more separate drive gears of the motor 61', which may be coupled to an inner portion of the base 30'. According to another exemplary embodiment, the housing 60' houses the motor 61' or a plurality of motors 61' therein.

The housing 60' further includes an outer surface 60*b*' that defines a poke-a-yoke feature for locating and aligning the housing 60' relative to the base 30'. For example, the housing 60' may include a longitudinal protrusion on the outer surface 60*b*' that is configured to engage a complementary feature defined by an inner of the base 30' that defines an opening 32*a*', so as to align and detachably couple the housing 60' to the base 30'. The housing 60' and/or the base 30' may include a fastening arrangement for detachably coupling the housing 60' to the base 30', such as snap-fit features, bayonet features, or other types of fastening arrangements to allow the housing 60' to be removable from the base 30'. In this way, the cover 70' and the seat 50' may be selectively removed from the base 30' via the housing 60' as a seat and cover sub-assembly, so as to allow for repair, maintenance, or cleaning of the various components of the toilet 20'.

The opening mechanism 120' allows the cover 70' and the seat 50' to each be pivoted or rotated backward about an angled axis 124' in order to move between the lowered position 72' and the stowed position 74'. The angled axis 124' is an axis that extends in an upward direction at an angle relative to the vertical and longitudinal axes (e.g., an oblique angle) forward toward a front end 42' of the base 30' (where the vertical axis (i.e., the z-axis) extends vertically along the height of the base 30' and the longitudinal axis (i.e., the x-axis) extends horizontally along the depth of the base 30' (i.e., between the front end 42' and the back end 44' of the base 30')). The angled axis 124' extends through the elongated members 53',73' lengthwise through the opening 53*a*'. The lateral axis (i.e., the y-axis), the vertical axis (i.e., the z-axis), and the longitudinal axis (i.e., the x-axis) are substantially perpendicular to each other.

While the cover 70' and the seat 50' are in the stowed position 74', the top rim 36' and the bowl 32' of the base 30' are exposed and the user may therefore use the toilet 20'. For example, the user may use the toilet 20' while standing and thus facing the top surface 76' of the cover 70' in this position.

It is understood that, in order to move the cover 70' and the seat 50' back from the stowed position 74' to the lowered position 72', the cover 70' and the seat 50' are moved in the same, but opposite, manner as described above.

The covers 70,70' and the seats 50,50' can be raised completely or partially automatically by a motor or a plurality of motors (e.g., motor 61', etc.). The motor(s) may be operatively coupled to a control system (e.g., control system 500 shown in FIG. 4, etc.) to enable the electronic control of the movement of the covers 70,70' and the seats 50,50' in response to a user input. Alternatively, the covers 70,70' and the seats 50,50' can be manually or mechanically raised by a user. According to another embodiment, the opening mechanisms 120,120' may optionally be spring-guided or spring-loaded. Accordingly, the opening mechanisms 120, 120' may include springs to assist or guide the movement the covers 70,70' and the seats 50,50' in either or both directions (in particular during their respective rotation about the angled axis 124 and angled axis 124'). According to another embodiment, the line pressure of water may be used to coil, wind-up, actuate, or charge the spring by counter-torquing the spring. The spring may optionally be charged when the toilets 20,20' are pre-washed during a courtesy flush. Additionally, due to the size and configuration of the opening mechanisms 120,120', air and/or liquid can be delivered to the seats 50,50' and/or covers 70,70' through the opening mechanisms 120,120' to be used for a vacuum mechanism 220 or flush mechanisms 620,620', as described further herein.

Opening and Closing Control Structure

Figure 4:
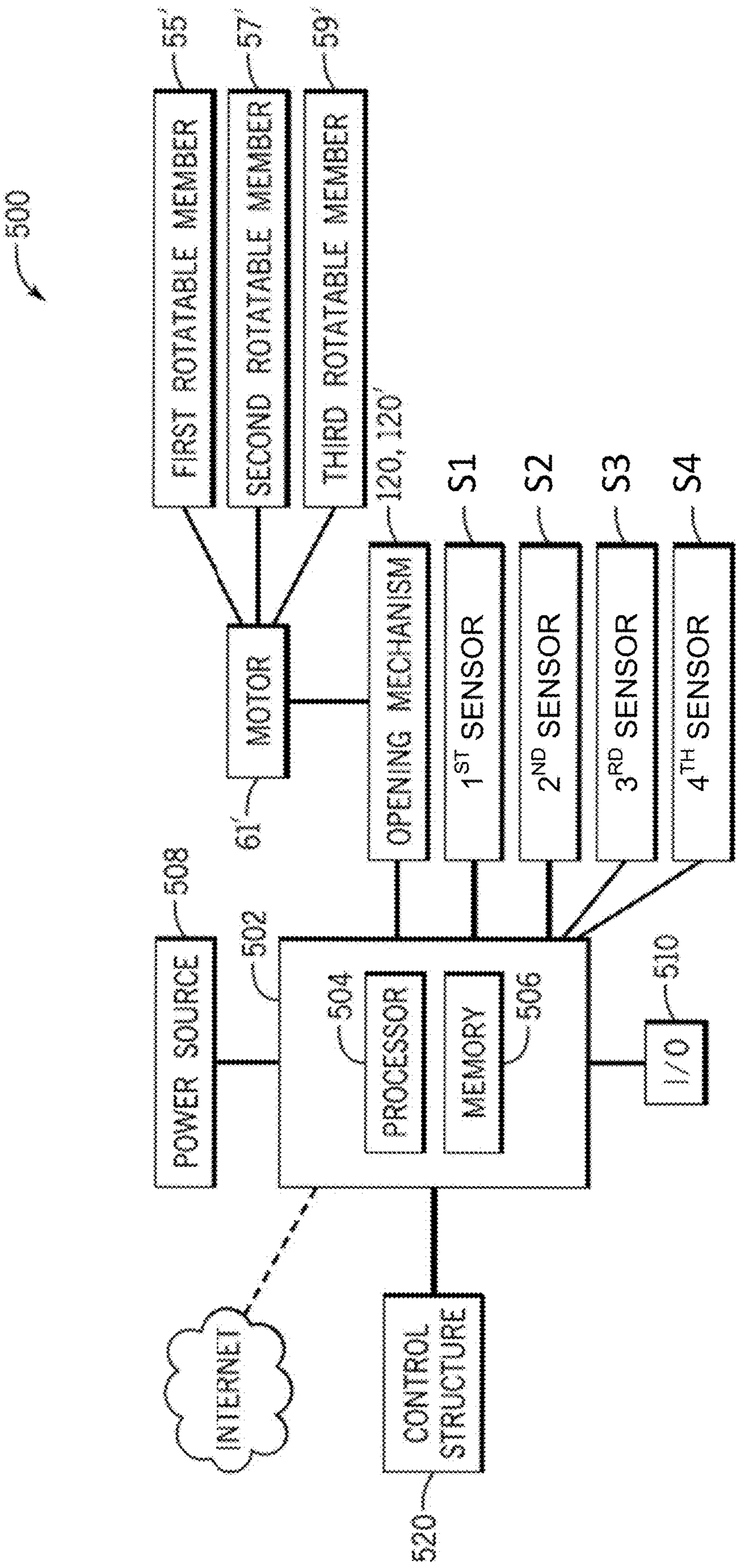
FIG. 4 is a schematic view of a control system for the cover and seat opening mechanism of the toilet according to an exemplary embodiment.

Referring to FIG. 4, a control system 500 for each of the toilets 20,20' to enable various functions of the toilets 20,20' is shown according to an exemplary embodiment. The control system 500 includes a processing circuit 502 that is cooperatively defined by a processor 504 and a memory 506. In the various embodiments described herein, the processor 504 may be implemented as a general-purpose processor, an application specific integrated circuit (ASIC), one or more field programmable gate arrays (FPGAs), a digital-signal-processor (DSP), a group of processing components, or other suitable electronic processing components. Memory 506 is one or more devices (e.g., RAM, ROM, Flash Memory, hard disk storage, etc.) for storing data and/or computer code for facilitating the various processes described herein. In other embodiments, memory 506 may be a portable storage device such as an SD card, a micro SD card, or other similar type of portable storage device. Memory 506 may be or include non-transient volatile memory or non-volatile memory. Memory 506 may include database components, object code components, script components, or any other type of information structure for supporting the various activities and information structures described herein. Memory 506 may be communicably connected to processor 504 and provide computer code or instructions to processor 504 for executing the processes described herein.

Still referring to FIG. 4, the processing circuit 502 is powered by a power source 508. According to an exemplary embodiment, the power source 508 is a battery pack that is coupled to the toilets 20,20', such as in the bases 30,30' or in the covers 70,70'. The power source 508 may be coupled in a rear portion of the covers 70,70', such that the power source 508 can also function as a counterweight to help enable rotational movement of the covers 70,70' about the angled axes 124,124'. According to another exemplary embodiment, the power source 508 is located remotely from the toilets 20,20'. The control system 500 further includes an I/O communications interface 510 that can allow for electronic communication between the toilets 20,20' and a mobile communication device, such as a smartphone, a tablet, a laptop, etc., so as to enable the remote control and programming of various functions of the toilets 20,20'. The I/O communications interface 510 may also be configured to provide various feedback signals to a user, such as audible, visual, or other types of signals to indicate various states, functions, or conditions of the toilets 20,20'. In addition, the I/O communications interface 510 may include a microphone or similar device coupled to the toilet 20' to allow a user to use voice commands to control various functions of the toilet 20'. The processing circuit 502 may be operatively coupled to the Internet to enable, for example, over-the-air software updates for various components of the toilets 20,20', downloading diagnostic information, use information, or the like.

The processing circuit 502 is in communication with the opening mechanism 120 for the seat 50 and cover 70. The opening mechanism 120 may include a drive mechanism such as motor 61' or a solenoid configured to move the seat 50 and/or cover 70 with respect to the base. The motor 61' is operable the engage the first rotatable member 55' to permit translational movement of the seat 50 and the cover 70 in an axial direction. The motor 61' is operable to engage the second rotatable member 57' to permit translational movement of the cover 70' (independent of the seat 50'). The motor 61' is operable to engage the third rotatable member 59' to permit translational movement of the seat 50' (independent of the cover 70').

The processing circuit 502 is in communication with one or more sensors (e.g., a plurality of sensors) from a group including a first sensor S1, a second sensor S2, a third sensor S3, and a fourth sensor S4. Various combinations of sensors as well as an individual sensor may be used in the disclosed embodiments.

The first sensor S1 may correspond to an image sensor. The first sensor S1 may be an image collection device with a lens such as a digital aperture collection device (e.g., camera) or an image collection device with a charge coupled device (CCD) such as an integrated circuit formed on a silicon surface forming light sensitive elements. The first sensor S1 may be a retina scanner configured to scan the eyes of the user. The retina scan may detect the position of the eyes, which is indicative of the orientation or facing direction of the user. The retina scan may indicate an eye signature for identification of the user. The first sensor S1 may be a low resolution image sensor. A low resolution image sensor may be defined as having less that a predetermined number of pixels in the viewing range proximate to the toilet 10. The predetermined number of pixels may be 100 pixels (e.g., 10 by 10 pixels), 4096 pixels (e.g., 64 by 64 pixels), 10,000 pixels (e.g., 100 by 100 pixels), or another value. The low resolution image sensor may be defined as having less than a predetermined frame rate. Example low resolution predetermined frame rates may be 10 frames per second, 5 frames per second or another value.

The second sensor S2 may correspond to a proximity sensor. The proximity sensor may be employed to detect the presence of a user within a zone of detection near the toilet 20. Electric potential sensors, projected capacitance sensors, light detection and ranging (LiDAR), and infrared sensors (e.g., projected infrared sensors, passive infrared sensors) are non-limiting examples of proximity sensors that may be employed with the systems of this disclosure. Motion sensors may be employed to detect motion (e.g., a change in position of an object relative to the object's surroundings). Electric potential sensors, optic sensors, radio-frequency (RF) sensors, sound sensors, magnetic sensors (e.g., magnetometers), vibration sensors, and infrared sensors (e.g., projected infrared sensors, passive infrared sensors) are non-limiting examples of motion sensors that may be employed with the systems of this application. In another example, the sensor may include a time of flight (ToF) or a light detection and ranging (LiDAR) that serves as a proximity sensor.

In one embodiment, a single sensor such as the LiDAR sensor may perform the functions of both the first sensor S1 and the second sensor S2. The LiDAR sensor may generate a series of laser pulses that are emitted toward the user and reflect from the user (e.g., the user's face or the user's body). As the return pulses are detected by the LiDAR sensor, a point cloud or three-dimensional map is generated based on the amount of time for the pulses to reach the user and return to the LiDAR sensor. The process is repeated many times and the point cloud or three-dimensional map may include thousands, millions, or more data points.

The third sensor S3 may correspond to a capacitance sensor associated with the seat 50. The third sensor S3 may be responsive to touch on the seat 50. The fourth sensor S4 may correspond to a pressure or weight sensor. The fourth sensor S4 may be responsive to the weight from the user sitting on the seat 50.

The processing circuit 502 is configured to generate and send commands to the motor 61 or other drive mechanism to open and close the seat 50 and cover 70 according to the data collected by the sensors. The processing circuit 502 is a controller configured to determine an orientation of the user based on the sensor data and generate a command for the drive mechanism in response to the orientation of the user. Example orientations of the user include facing the toilet 10 or facing away from the toilet 10. Example orientation of the user include approaching the toilet 10 or stepping away from the toilet 10.

In some examples, the processing circuit 502 utilizes the image data from the first sensor S1 to determine whether a user is facing the toilet 10 or facing away from the toilet 10. For example, the processing circuit 502 analyzes the image data to determine whether human facial features (e.g., facial recognition) can be identified from the image data. When facial features are identified, the processing circuit 502 determines that the user is facing the toilet 10. Otherwise, the processing circuit 502 determines that the user is facing away from the toilet 10. When the user is facing the toilet 10, the seat 50 and cover 70 are opened. When the user is facing away from the toilet 10, the seat 50 and cover 70 are closed. In the LiDAR example, the processing circuit 502 may compare the point cloud or three-dimensional map to a template or other thresholds to identify the direction that the user is facing.

In addition, the processing circuit 502 may determine whether the user has turned around. For example, after the processing circuit 502 determines that the user is facing the toilet 10, the processing circuit 502 may further analyze the image data to determine that the image data still includes the user but no longer includes facial features. This indicates that the user has turned around. When the user has turned around, the processing circuit 502 may generate a command for the seat 50 to close (e.g., lowered position) and/or the cover 70 to remain open (e.g., stowed position).

In addition, the processing circuit 502 may determine whether the user walked away from the toilet 10. For example, after the processing circuit 502 determines that the user is facing the toilet 10, the processing circuit 502 may further analyze the image data to determine that the image data no longer includes the user and/or no longer includes facial features. This indicates that the user is no longer present at the toilet 10. When the user is no longer present, the processing circuit 502 may generate a command for the seat 50 to close (e.g., lowered position) and/or the cover 70 to close (e.g., lowered position).

The processing circuit 502 may determine the orientation of the user based on a template. The memory 506 may be configured to store a plurality of templates for possible orientations of the user. The processing circuit 502 is configured to access the templates from memory 506 and compare the image data from at least one of the sensors S1-S4 to the plurality of templates. In one example, the templates are based on image data at the sensor data compared to the template is from the first sensor S1. At least one of the templates includes a pixel arrangement indicative of a face of a user (e.g., facial feature). The processing circuit 502 compares the collected image data to determine if there is a match with the facial feature. If there is a match, the processing circuit 502 determines that the user in facing the toilet 10. Other templates may include pixel arrangements indicative of the back of a user (e.g., hair).

Figure 5:
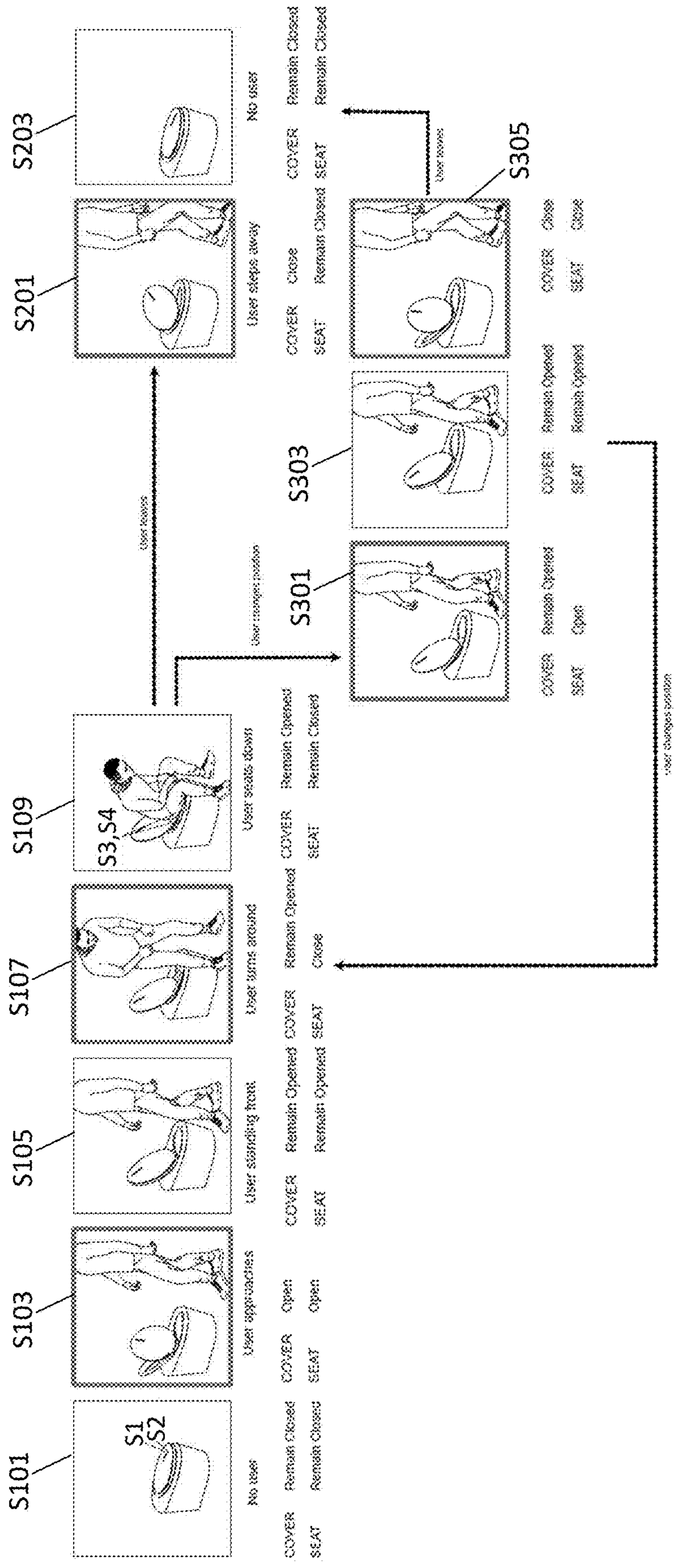
FIG. 5 is an example control sequence for the control system for the cover and seat opening mechanism of the toilet.

FIG. 5 illustrates an example sequence for the detection of the user and operation of the toilet 10 or another automated toilet including the automatic raising and/or lowering of a seat 50 and/or cover 70 based on the direction a proximate user is facing with respect to the toilet 10. The sequences or states illustrated in FIG. 5 may be performed in any order and in any combination. The sequences or states in FIG. 5 are illustrated to show the permutations of an operation of the toilet 10. An example operation may normally include fewer states or sequences than illustrated.

At state S101, the user is not present at the toilet 10, the cover 70 remains closed, and the seat 50 remains closed. State S101 illustrates the non-operation of the toilet 10 when no detections of a user are made by the sensors of the toilet 10. The processing circuit 502 may remain in idle or standby mode during state S101.

At state S103, the user is approaching the toilet 10, the cover 70 is opened, and the seat 50 is opened. The processing circuit 502 may first examine sensor data from the second sensor S2 to determine whether a user is withing ap redetermined distance range of the toilet 10. The approach of the user may be detected by the second sensor S2 (e.g., proximity sensor). The second sensor S2 may transmit a laser, infrared signal, sonar signal, radar signal, or other type of motion sensors to detect motion (e.g., a change in position of the user) in proximity of the toilet 10. When the second sensor S2 detects the user, the processing circuit 502 generates one or more commands to open the seat 50 and the cover 70. When the second sensor S2 detects the user, the processing circuit 502 may be awaken from idle or standby mode and begin collecting image data via sensor S1. The default state of the processing circuit 502 is to open the cover 70 and the seat 50 when the user is detected.

At state S105, the user is facing the toilet 10, the cover 70 is opened, and the seat 50 is opened. The processing circuit 502 collects image data for the user in proximity of the toilet 10 from the first sensor S1. The processing circuit 502 identifies an orientation of the user in proximity of the toilet 10. In some examples, the orientation of the user is defined as whether or not there are facial features identified in the image data. In some examples, other characteristics of the user may be detected (e.g., hands, feet, zipper). In response to the orientation of the user, the processing circuit 502 either generates commands to actuate the seat 50 and/or cover 70 for the toilet 10 in response to the orientation of the user or maintains the open state of the seat 50 and/or cover 70 for the toilet 10 in response to the orientation of the user.

At state S107, the user turns around, the cover 70 remains opened, and the seat 50 is closed. The processing circuit 502 collects image data for the user in proximity of the toilet 10 from the first sensor S1. The processing circuit 502 identifies an orientation of the user in proximity of the toilet 10, for example, by the absence of facial features identified in the image data. In response to the orientation of the user and the absence of facial features, the processing circuit 502 generate one or more commands to actuate the seat 50 to the closed position (e.g., lowered positioned). In addition, the processing circuit 502 may maintain the cover 70 for the toilet 10 in the closed position in response to the orientation of the user.

At state S109, the user sits on the toilet 10, the cover 70 remains opened, and the seat 50 remains closed. The third sensor S3 and/or the fourth sensor S4 may detect that the user is sitting on the toilet. The processing circuit 502 may maintain the cover 70 in the open position and the seat 50 in the closed position when the third sensor S3 and/or the fourth sensor S4 indicates the user is sitting. In some examples, when the third sensor S3 and/or the fourth sensor S4 indicate the user has stood up, the processing circuit 502 may actuate the cover 70 to the closed positions. In other examples, the processor circuit 502 may maintain the position of the seat 50 and the cover 70 until additional image data is collected by the first sensor S1.

At state S201, the user steps away from the toilet 10, the cover 70 is closed, and the seat 50 remains closed. As described above, the processing circuit 502 collects proximity data from the second sensor S2. When the proximity data indicates that the user is no longer in proximity or moving away from the toilet 10, the processing circuit 502 generates one or more commands to close the seat 50 and/or cover 70. At state S203, the user is no longer present at the toilet 10, the cover 70 remains closed, and the seat 50 remains closed.

Returning to an earlier branch in the diagram, state S301 illustrates a scenario in which a user sitting at the toilet 10 stands and faces the toilet 10. At state S301, the user changes position (e.g., stands up and faces the toilet 10), the cover 70 remains opened, and the seat 50 is opened. The processing circuit 501 collects image data for the user in proximity of the toilet 10 from the first sensor S1. The processing circuit 502 identifies an orientation of the user in proximity of the toilet 10 as leaving the proximity of the toilet 10. In some examples, the orientation of the user is defined as whether or not there are facial features identified in the image data. In response to the orientation of the user, the processing circuit 502 either generates commands to actuate the seat 50 to the open position (e.g., stowed position) for the toilet 10 in response to the orientation of the user or maintains the open state of the cover 70 for the toilet 10 in response to the orientation of the user. At state S303, the user is facing the toilet 10, the cover 70 remains opened, and the seat 50 remains opened as the user continues to stand facing the toilet 10.

At state S305, the user steps away from the toilet 10, the cover 70 is closed, and the seat 50 remains closed. As described above, the processing circuit 502 collects proximity data from the second sensor S2. When the proximity data indicates that the user is no longer in proximity or moving away from the toilet 10, the processing circuit 502 generates one or more commands to close the seat 50 and/or cover 70.

In addition to any of these examples, the user may also provide manual commands to the toilet 10 to move the seat 50 and the cover 70 from the open position to the closed position and vice versa independently or in tandem. The manual commands may include gestures, voice commands, or commends from a mobile device (e.g., tablet, remote control). For example, a user can selectively operate the motor 61' to move the cover 70' and the seat 50' between the lowered position 72' and the stowed position 74' by pressing or activating a control on the control structure 520 associated with controlling the movement of the cover 70' and/or the seat 50'. Alternatively, a user may send a control signal via a software application available on a mobile communication device to the processing circuit 502 via the I/O communication interface 510, so as to remotely control the movement of the cover 70' and/or the seat 50'. A control signal can be sent from the processing circuit 502 to, for example, the motor 61' to control the movement of the cover 70' and/or the seat 50'. The control structure 520 may include a plurality of controls associated with the various components of the opening mechanism 120', such as the first rotatable member 55', the second rotatable member 57', and the third rotatable member 59', respectively, so as to allow for the selective and independent control of rotation of the cover 70' and/or the seat 50' about the angled axis 124' (e.g., to move the cover 70' and the seat 50' between the lowered position 72' and the stowed position 74') or translation of the cover 70' and the seat 50' along the angled axis 124' (e.g., to assist a user with standing from a seated position on the seat 50'). It should be understood that the control structure 520 may include additional controls to control other features of the toilets 20,20' in a similar manner described above.

Flushing Control Structure

Generally speaking, most conventional toilets are controlled (e.g., flushed, etc.) with a control or actuator (e.g., a lever, etc.) positioned along the body of the toilet, such as on a tank of the toilet. However, the control(s) on a conventional toilet may not always be convenient for a user to access.

Accordingly, the toilet 20 includes a control structure 520 that is configured to control one or more features of the toilet 20. It should be appreciated that the control structure 520 may be similarly applied to the cover 70' of the toilet 20' to enable the control of one or more features of the toilet 20', according to another exemplary embodiment. Due to the positioning of the control structure 520 (as described further herein), the control structure 520 is readily accessible to a user. The control structure 520 may form part of a control system 500 that can be integrated in and/or coupled to each of the toilets 20,20' to enable automatic or electronic activation of various functions of the toilets 20,20', as described in further detail herein.

The control structure 520 includes at least one control (e.g., button, actuator, etc.) that the user can press or activate to control a feature of the toilet 20. The controls are configured to control a variety of different functions or features of the toilet 20, including but not limited to controlling the opening mechanism 120 (i.e., to move the seat 50 and/or the cover 70). The controls may optionally be touchless controls (e.g., proximity sensors, capacitive sensors, etc.). The various controls may be a variety of different sizes and shapes. The controls may be electronic and/or mechanical controls. For example, according to one embodiment, one of the controls may send an electronic signal to flush the toilet 20 (e.g., to activate the flush mechanism, etc.). According to another embodiment, one of the controls may pull a wire to flush the toilet 20 (e.g., to activate the flush mechanism). The electronic or mechanical wiring for the controls may extend through the opening mechanism 120 that movably attaches the cover 70 and the base 30, as described further herein.

Referring to FIG. 4, a control system 500 for each of the toilets 20,20' to enable various functions of the toilets 20,20' is shown according to an exemplary embodiment. The control system 500 includes a processing circuit 502 that is cooperatively defined by a processor 504 and a memory 506. In the various embodiments described herein, the processor 504 may be implemented as a general-purpose processor, an application specific integrated circuit (ASIC), one or more field programmable gate arrays (FPGAs), a digital-signal-processor (DSP), a group of processing components, or other suitable electronic processing components. Memory 506 is one or more devices (e.g., RAM, ROM, Flash Memory, hard disk storage, etc.) for storing data and/or computer code for facilitating the various processes described herein. In other embodiments, memory 506 may be a portable storage device such as an SD card, a micro SD card, or other similar type of portable storage device. Memory 506 may be or include non-transient volatile memory or non-volatile memory. Memory 506 may include database components, object code components, script components, or any other type of information structure for supporting the various activities and information structures described herein. Memory 506 may be communicably connected to processor 504 and provide computer code or instructions to processor 504 for executing the processes described herein.

Still referring to FIG. 4, the processing circuit 502 is powered by a power source 508. According to an exemplary embodiment, the power source 508 is a battery pack that is coupled to the toilets 20,20', such as in the bases 30,30' or in the covers 70,70'. The power source 508 may be coupled in a rear portion of the covers 70,70', such that the power source 508 can also function as a counterweight to help enable rotational movement of the covers 70,70' about the angled axes 124, 124'. According to another exemplary embodiment, the power source 508 is located remotely from the toilets 20,20'. The control system 500 further includes an I/O communications interface 510 that can allow for electronic communication between the toilets 20,20' and a mobile communication device, such as a smartphone, a tablet, a laptop, etc., so as to enable the remote control and programming of various functions of the toilets 20,20'. The I/O communications interface 510 may also be configured to provide various feedback signals to a user, such as audible, visual, or other types of signals to indicate various states, functions, or conditions of the toilets 20,20' (e.g., the heating mechanism 420 is operating, the vacuum mechanism 220 has completed an odor removal process, etc.). In addition, the I/O communications interface 510 may include a microphone or similar device coupled to the toilet 20' to allow a user to use voice commands to control various functions of the toilet 20'. The processing circuit 502 may be operatively coupled to the Internet to enable, for example, over-the-air software updates for various components of the toilets 20,20', downloading diagnostic information, use information, or the like.

Still referring to FIG. 4, the processing circuit 502 is also operatively coupled to the control structure 520 to enable the operation of, for example, the opening mechanisms 120,120' (e.g., motor 61', etc.). The control structure 520 may include a plurality of controls that are associated with the opening mechanisms 120,120' (e.g., motor 61', etc.).

Bidet Mechanism

Figure 6:
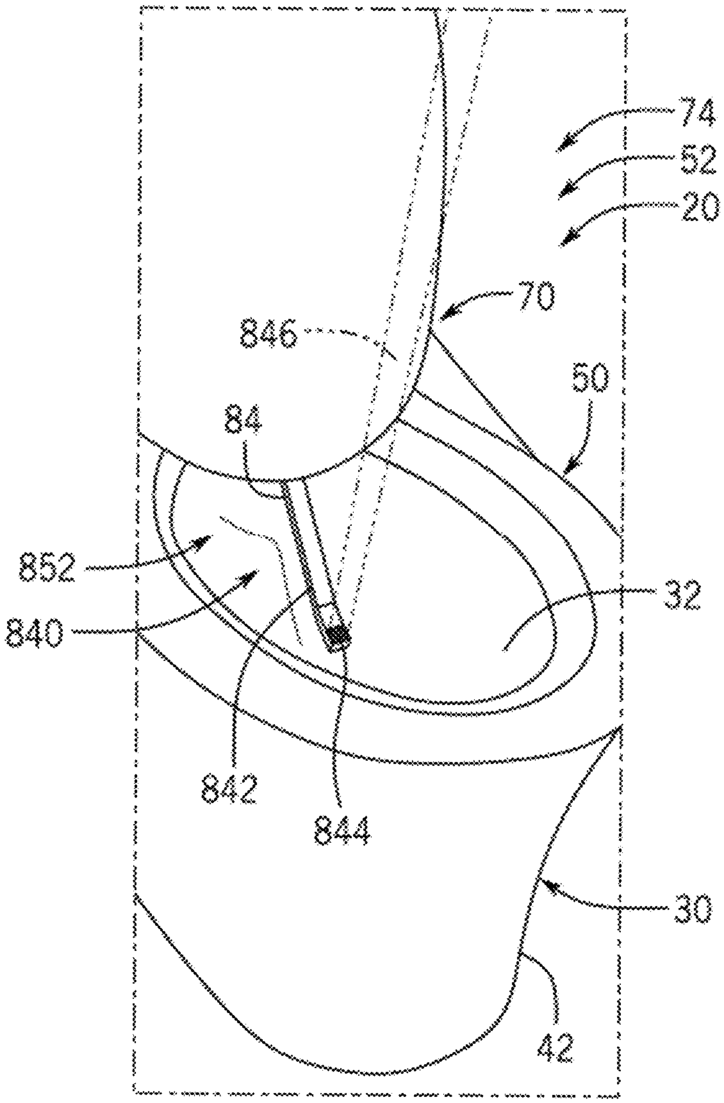
FIG. 6 illustrates an example bidet for the toilet.

According to another exemplary embodiment in FIG. 6, the toilet 20 has a bidet mechanism 840 that is configured to clean the underside of a user. The bidet mechanism 840 includes a bidet wand 842 that is retractable into and extendable out from the cover 70. Accordingly, the bidet wand 842 is movable between a stowed or retracted position and an exposed or extended position 852. In the extended position 852, the bidet wand 842 is at least partially exposed and extended out from the cover 70 and extends over a portion of the bowl 32 of the base 30. Optionally, the bidet wand 842 may extend both downwardly and forward into the extended position 852 in order be recessed within a portion of the bowl 32 and positioned within a central area of the bowl 32. Accordingly, the user can use the bidet mechanism 840 and wash themselves when the bidet wand 842 is in the extended position 852. In the retracted position, the bidet wand 842 is retracted into the cover 70 and is substantially concealed by the cover 70 for storage.

The bidet wand 842 is positioned near or along the back end 84 of the cover 70 such that the bidet wand 842 can extend out from the back end 84 of the cover 70 and over a portion of the bowl 32 when the cover 70 is in the stowed position 74. The bidet wand 842 is movably attached to the cover 70. Accordingly, the cover 70 includes an aperture that the bidet wand 842 can move within and in and out of between the retracted position and the extended position 852. In the retracted position, the bidet wand 842 is positioned substantially within the aperture of the cover 70. By positioning the bidet wand 842 with, or at least partially within, the cover 70, the bidet mechanism 840 conserves and saves space within the toilet 20 and promotes better hygiene.

The bidet wand 842 includes at least one upper nozzle 844 positioned on the top side of the bidet wand 842 and toward the end of the bidet wand 842 (i.e., along an end of the bidet wand 842 that is furthest from the cover 70 in the extended position 852). When the bidet mechanism 840 is turned on, the nozzles 844 upwardly dispense a stream or jet rinse 846 to clean the user. The jet rinse 846 may optionally be angled upward and toward the front end 42 of the base 30 in order to better clean the user. The jet rinse 846 may be water.

The bidet mechanism 840 may further include a motor operatively coupled to the bidet wand 842 to selectively control the movement of the bidet wand 842 between the retracted position, the first extended position, and the second extended position. According to an exemplary embodiment, the motor forms part of a linear actuator for translating the bidet wand 842 between the various positions.

The bidet mechanism 840 and/or or the motor may be controlled by the processing circuit 502 in response to the orientation of the user. The bidet mechanism 840 may be moved to the retracted position (e.g., from the first extended position or the second extended position) when the image data collected by the first sensor S1 indicates that the user is facing the toilet 10. Examples when the user is facing the toilet 10 include scenarios in which the image data collected by the first sensor S1 includes facial features or retina scans. The bidet mechanism 840 may be moved to the first extended position or the second extended position when the image data collected by the first sensor S1 indicates that the user is not facing the toilet 10. The bidet mechanism 840 may be moved to the first extended position or the second extended position when the image data collected by the third sensor S3 or the fourth sensor S4 indicates that the user is sitting on the seat 50. In some examples, the bidet mechanism 842 is moved to the first extended position when the third sensor S3 detects the user and moved to the second extended position when the fourth sensor S4 detects the user.

In addition, or in the alternative, the bidet mechanism 840 may be controlled by controls on the toilet 20 (e.g., control structure 520, etc.) and/or controls on a software application that may be accessible via a mobile device. The controls may allow the user to control a variety of different aspects of the bidet mechanism 840, including turning the bidet mechanism 840 on and off and positioning the bidet wand 842.

User Profiles

The bidet mechanism 840 may include a variety of user inputs for specifying settings for the bidet. For example, the user may specify a temperature of the water, a pressure of the water, a nozzle type, a position for the wand, or other settings. In the following embodiments, the user is detected and the user's settings are stored as a profile. When the user returns to the toilet and bidet mechanism 840, the user's profile is retrieved in order to automatically apply the settings that the user has selected in the past. In some examples, the user's profile is modified over time. The user may be identified by a physical property such as weight or height. In certain private environments for the toilet and bidet mechanism 840, such as a house, only a few users may be present, and these users may be easily distinguished on a basis of height and/or weight.

Figure 7:
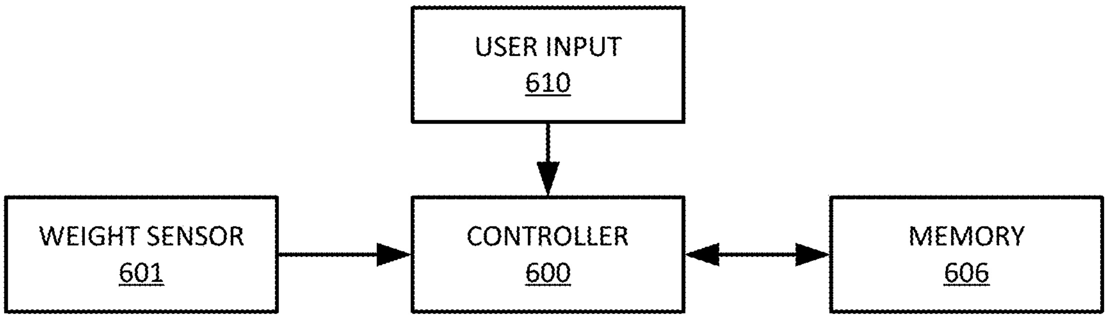
FIG. 7 illustrates an example control system for the selection of a user profile for the toilet and/or bidet.
Figure 8:
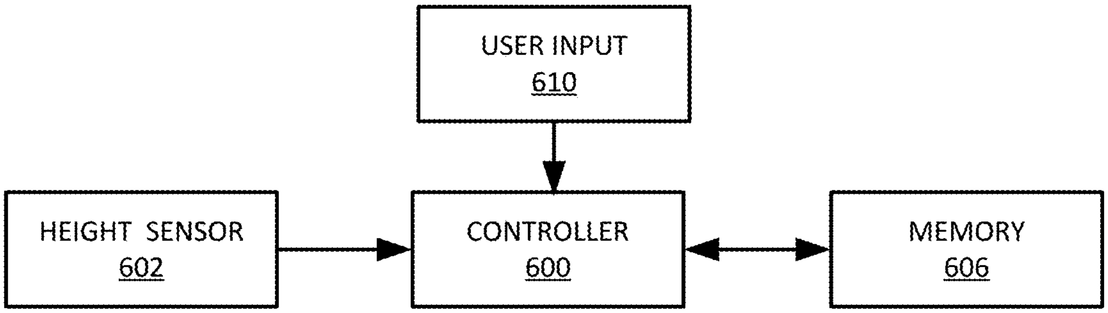
FIG. 8 illustrates another example control system for the selection of a user profile for the toilet and/or bidet.
Figure 9:
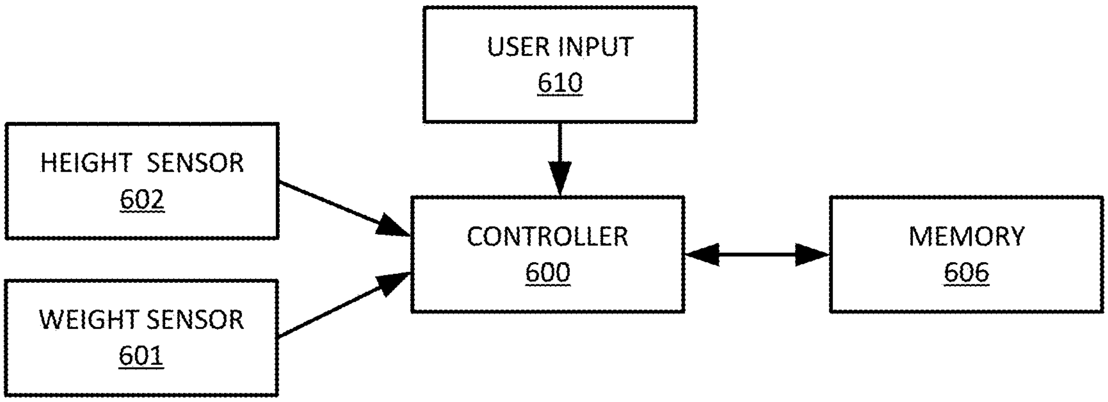
FIG. 9 illustrates another example control system for the selection of a user profile for the toilet and/or bidet.

FIGS. 7-9 illustrate an example control system for the selection of a user profile for the toilet and/or bidet mechanism 840. One or more sensors may be used to detect the physical property of the user. In FIG. 7, a weight sensor 601 provides sensor data for the physical property of the user to the controller 600, which stores the sensor data along with one or more settings from the user input 610 in memory 606. One example for the weight sensor 601 may include the fourth sensor S4 as described herein. The weight sensor 601 may correspond to a pressure or weight placed on the seat or the toilet. Example placements for the weight sensor 601 include under the seat 50, within the seat 50, inside of a hinge coupled to the seat 50, under the base 30 of the toilet, or within the base 30 of the toilet.

When the weight sensor 601 is under the seat 50 or within the seat 50, when the user sits on the seat 50 pressure is placed on the weight sensor 601. It should be noted that the weight sensor 601 may not measure the entire weight of the user. In many circumstances, the user's feet place pressure on the floor, which reduces the weight detected by the weight sensor 601.

When the weight sensor 601 is inside of the hinge, the hinge may flex in response to the user sitting on the seat 50. The flex, or pressure detected in the hinge by the weight sensor 601, may be proportional to the weight of the user.

When the weight sensor 601 is under the base 30 or within the base 30, the weight sensor 601 detects weight placed on the seat 50 based on the weight on the toilet as a whole.

In FIG. 8, a height sensor 602 provides sensor data for the physical property of the user to the controller 600, which stores the sensor data along with one or more settings from the user input 610 in memory 606.

One example for the height sensor 602 may include an image sensor, for example as described herein with respect to first sensor S1. The height sensor 602 may be a camera or a charge coupled device (CCD) such as an integrated circuit formed on a silicon surface forming light sensitive elements. The height sensor 602 may be a retina scanner configured to scan the eyes of the user. The retina scan may detect the position of the eyes and from the position of the eyes, estimate the height of the user. The height sensor 602 may be a low resolution image sensor having a predetermined number of pixels per unit area. The low resolution image sensor may be defined as having less than a predetermined frame rate.

In FIG. 9, both the height sensor 602 and the weight sensor 601 provide sensor data for the physical property of the user to the controller 600, which stores the sensor data along with one or more settings from the user input 610 in memory 606.

In any of these examples, the controller 600 is configured to both generate user profiles for the user during one or more initial uses of the toilet and access the user profiles for the user during one or more subsequent uses of the toilet.

The controller 600 receives the sensor data for the physical property of the user. The controller 600 may modify the sensor data according to one or more weights or coefficients. The controller 600 receives settings selected by the user input 610. Each setting may include a device value (e.g., wand, heater, etc), a duration value (e.g., 1 second, 2 second, 5 seconds), a position value (e.g., front, rear, right, left), and an intensity value (e.g., high pressure or low pressure, high temperature or low temperature). The controller 600 generates a user profile based on the setting including one or more of the device value, the duration value, and the intensity value, which is stored in memory 606 with the sensor data or modified sensor data.

The controller 600 also receives sensor data for the physical property of the user during a subsequent visit to the toilet. The subsequent sensor data is used to select the user profile from memory 606. The controller 600 is configured to determine at least one bidet setting in response to the identification data for the user.

Figure 10:
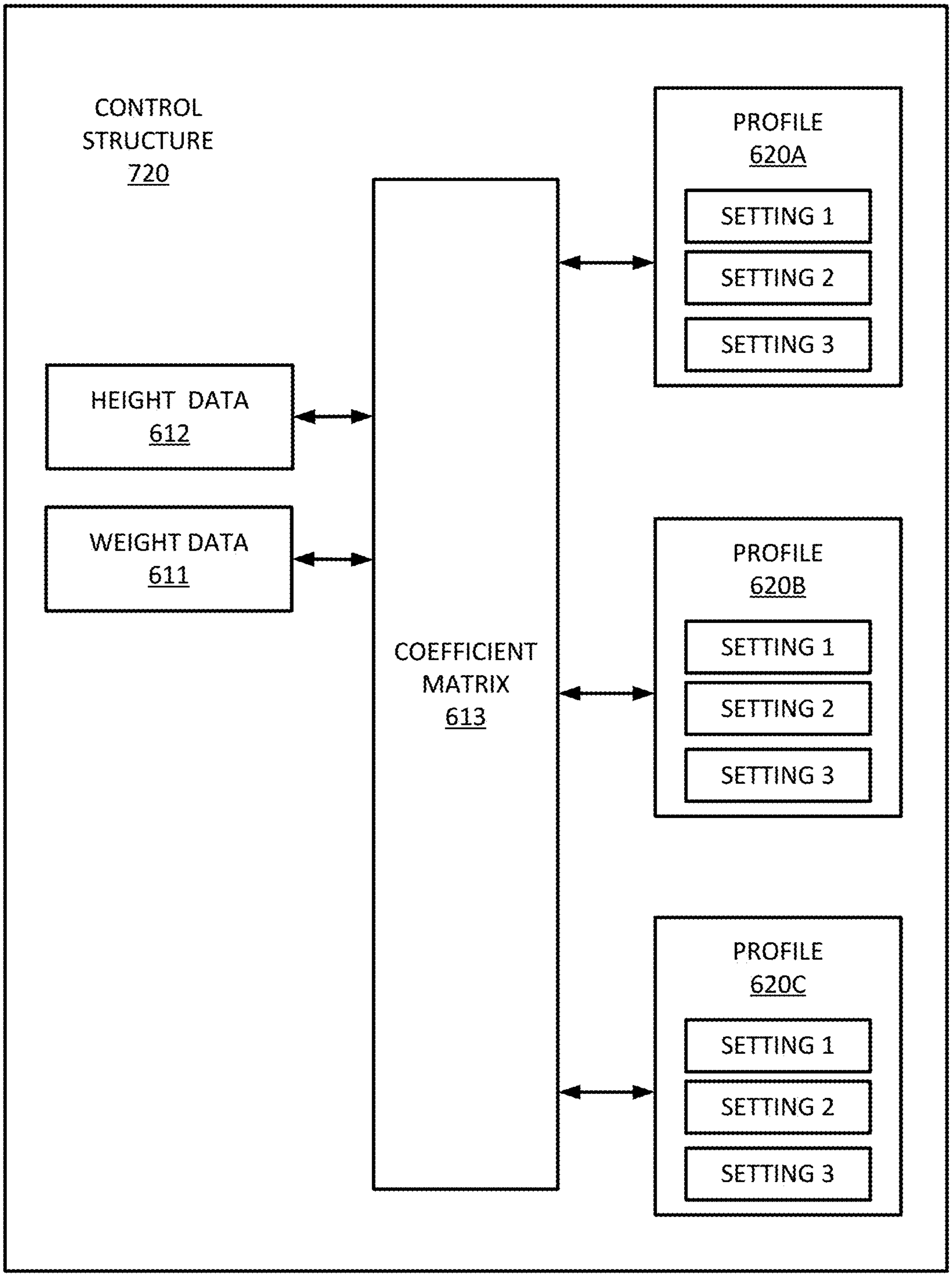
FIG. 10 illustrates an example control structure for the selection of the user profile.

FIG. 10 illustrate s a control structure 720, which may represent the controller 600 and/or the memory 606, for selecting bidet settings in response to the physical property of the user.

When the user is present at the toilet the control structure 720 receives values for the height data 612 and the weight data 611. It should be noted that height data 612 may be received as the user approaches the toilet and the weight data 611 may be received as the user sits at the toilet.

The control structure 720 may scale or otherwise modify the sensor data in order to define or select the user profiles. For example, the height data 612 and weight data 611 may be used in combination to create an aggregate value. A first scale factor may be applied to the height data 612 by a coefficient matrix 613 and a second scale factor may be applied to the weight data 611 by the coefficient matrix 613.

In other examples, the coefficient matrix 613 may applied a range or spread to the height data 612 and the weight data 611. In this way a range of values may be paired with the height data 612 for a range of heights to provide a more advantageous margin of error when matching the stored weight with the subsequently collected weight. Similarly, in this way a range of values may be paired with the weight data 611 for a range of heights to provide a more advantageous margin of error when matching the stored weight with the subsequently collected weight.

In other examples, the range of weight values and range of height values may be automatically determined over time. For example, the control structure 720 may analyze the historical data for height or weight and identify one or more statistical parameters of the data. For example, an array of weight values takes over time may include two clusters or two modes over time that identify that two primary users are present at the toilet. The control structure 720 may define a threshold or range (e.g., a predetermined number of standard deviations around the cluster) for identification of each user.

The control structure 720 may use in of this examples to define user profiles 620A-C. Similarly, the same calculations may be used to identify profiles 620A-C when subsequent data is received. Each of the profiles 620A-C includes at least one threshold or range for height, weight, or the combination of height and weight. Each of the profiles 620A-C includes at least one setting that is established by the user either from use of the bidet mechanism 840 or by direct input selection by the user. FIG. 10 illustrates that each of the profiles 620A-C includes setting 1, setting, 2, and setting 3, but any number of settings may be used. Example settings include bidet wand position, bidet spray type, bidet water pressure, front wash position, front wash spray type, front wash water pressure, wash temperature overall, individual rear wash temperature, individual front wash temperature, front wash mode/position/movement, dryer use (e.g., dryer comes out automatically after bidet duration), dryer temperature, or flush timing (e.g., flush after lid close, flush before lid close).

Figure 11:
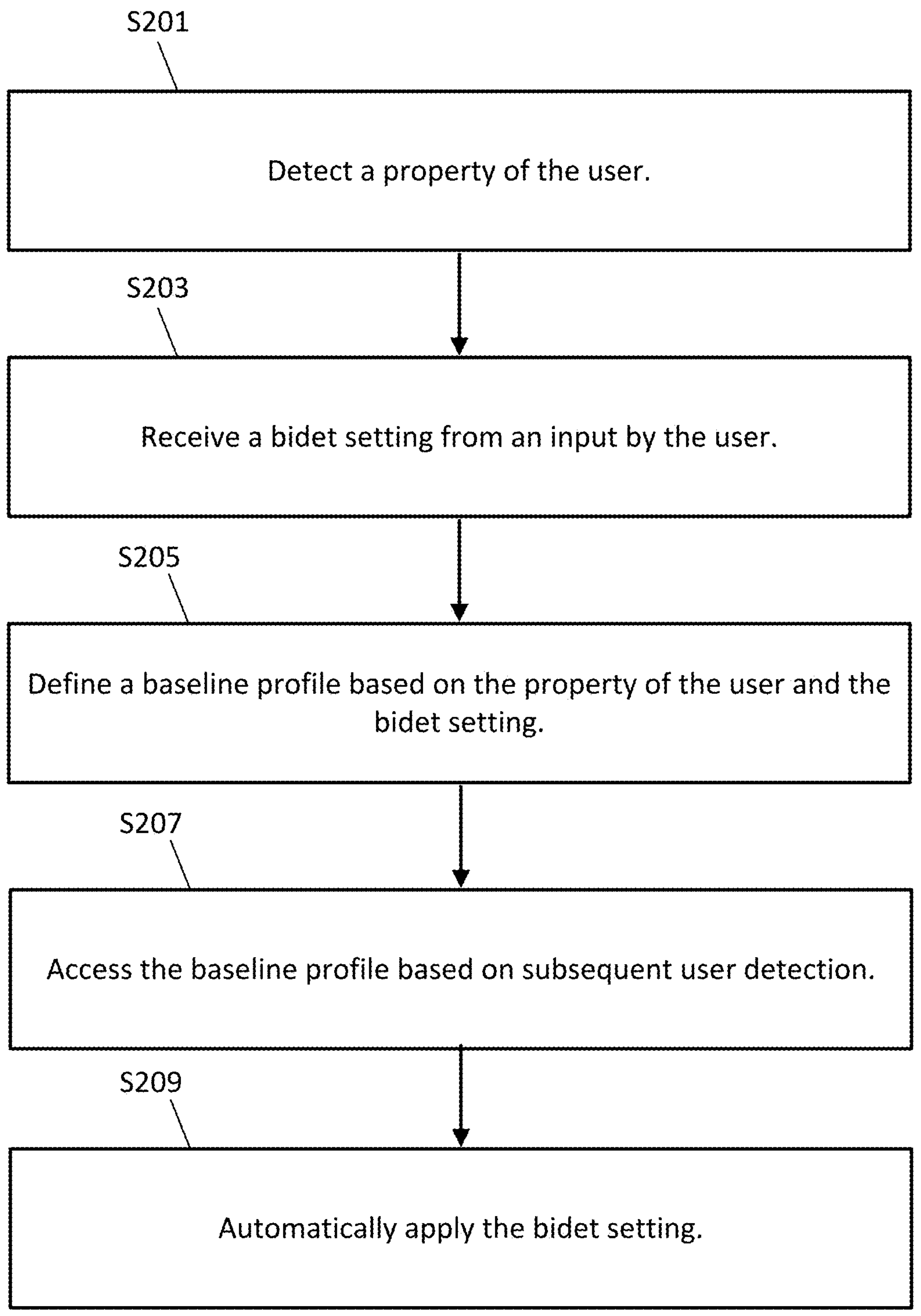
FIG. 11 illustrates an example flow chart for the creation and selection of user profiles.

FIG. 11 illustrates an example flow chart for the creation and selection of user profiles. Additional, different or fewer acts may be included.

At act S201, the controller 600 or sensor detects a property of a user and generates user data descriptive of the property of the user. In some examples, a proximity trigger may first detect the presence of the user, which causes the weight sensor 601 and/or height sensor 602 to detect specifics of the user.

At act S203, the controller 600 receives a bidet setting from an input by the user. The bidet setting includes any of the specific sequences, durations, devices, or modes of operation as described herein. The bidet settings may be passively recorded over time as the user uses the toilet and bidet. The user may be prompted directly by the bidet setting.

At act S205, the controller 600 may define a baseline profile based on the property of the user and the bidet setting. The controller 600 and memory 606 may store the baseline profile in association with the property of the user and the bidet setting.

At act S207, the controller 600 or the sensor, such as the proximity sensor, the weight sensor 601 or the height sensor 602 may detect a subsequent user. It should be noted that the term "subsequent user" refers to a subsequent instance of a user. It is often the same user that is detected in acts S201 and S207. The controller 600 compares a property of the subsequent user to the stored property and accesses the baseline profile in response to the comparison.

At act S209, the controller 600 identifies the bidet setting from the baseline profile. The controller 600 generates command signals for the bidet mechanism 840 to apply the bidet setting to the bidet and/or toilet.

Over time, the controller 600 is configured to update the profiles and bidet settings. The controller 600 may receive a second bidet setting from an input by the user and modifying the baseline profile based on the second bidet setting. Each of the settings of the user profiles 620A-C may be defines as an average of the inputs of the user over time. For example, if in some usages the user selects a first temperature and first pressure for the bidet and in some usages the user selects a second temperature and second pressure for the bidet, the controller may average (or weighted average) the values to determine an average temperature and average pressure that is stored in the updated user profile.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the toilet assembly as shown in the various exemplary embodiments is illustrative only. Additionally, any element disclosed in one embodiment may be incorporated or utilized with any other embodiment disclosed herein. For example, the various features, components, functions, and systems of the toilet 20 may be incorporated in the toilet 20' and vice versa. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A toilet comprising:

a base;

a seat rotatably coupled to the base and rotatable about an angled axis that is oriented upward and forward toward a front end of the base;

a drive mechanism configured to rotate the seat with respect to the base; and an image sensor configured to generate image data for a user within a predetermined distance to the base;

a proximity sensor configured to determine when the user is within the predetermined distance to the base; and a controller configured to determine an orientation of the user based on the image data and generate a command for the drive mechanism in response to the orientation of the user, wherein the controller analyzes data from the image sensor in response to data from the proximity sensor.

2. The toilet of claim 1, further comprising:

a memory configured to store a plurality of templates for possible orientations of the user, wherein the controller is configured to compare the image data to the plurality of templates.

3. The toilet of claim 1, wherein the drive mechanism comprises a motor configured to move the seat with respect to the base.

4. The toilet of claim 1, wherein the drive mechanism comprises a solenoid configured to move the seat with respect to the base.

5. The toilet of claim 1, wherein the orientation of the user indicates the user is facing the toilet.

6. The toilet of claim 1, wherein the orientation of the user indicates the user is facing away from the toilet.

7. The toilet of claim 1, wherein the orientation of the user indicates the user is approaching the toilet.

8. The toilet of claim 1, wherein the orientation of the user indicates the user is moving away from the toilet.

9. The toilet of claim 1, further comprising:

a cover rotatably coupled to the base, wherein the drive mechanism is configured to rotate the cover with respect to the base.

10. The toilet of claim 9, wherein the cover and the seat are each configured to rotate about the angled axis between a lowered position in which the cover and the seat are located adjacent the base and a stowed position in which the cover and the seat are oriented in an upward direction.

11. The toilet of claim 10, wherein the seat is configured to rotate between the lowered position and the stowed position while the cover is in the lowered position.

12. The toilet of claim 1, further comprising:

a seat sensor configured to determine when the user sits on the seat.

13. A toilet comprising:

a base;

a seat rotatably coupled to the base;

a drive mechanism configured to rotate the seat with respect to the base about a nonhorizontal axis; and a proximity sensor configured to determine when a user is within a predetermined distance to the base;

an image sensor configured to generate image data for the user; and a controller configured to analyze the image data when the user is within the predetermined distance to the base according to the proximity sensor, determine an orientation of the user based on the image data, and generate a command for the drive mechanism in response to the orientation of the user.

14. The toilet of claim 13, further comprising:

a memory configured to store a plurality of templates for possible orientations of the user, wherein the controller is configured to compare the image data to the plurality of templates.

15. The toilet of claim 13, wherein the drive mechanism comprises a motor configured to move the seat with respect to the base.

16. The toilet of claim 13, wherein the orientation of the user indicates the user is facing the toilet.

17. The toilet of claim 13, further comprising:

a cover rotatably coupled to the base, wherein the drive mechanism is configured to rotate the cover with respect to the base.

18. The toilet of claim 13, the toilet further comprising:

a seat sensor configured to determine when the user sits on the seat.

19. A method for operation of an automated toilet, the method comprising:

detecting a user in proximity of the toilet with a proximity sensor;

collecting image data using an image sensor for the user in proximity of the toilet in response to the detecting with the proximity sensor;

identifying an orientation of the user in proximity of the toilet; and actuating a seat for the toilet in response to the orientation of the user.

* * * * *